United States Patent
Kraus

(10) Patent No.: US 12,272,003 B2
(45) Date of Patent: Apr. 8, 2025

(54) VIDEOCONFERENCE METHOD AND VIDEOCONFERENCE SYSTEM

(71) Applicant: Casablanca.ai GmbH, Pforzheim (DE)

(72) Inventor: Carsten Kraus, Pforzheim (DE)

(73) Assignee: Casablanca.ai GmbH, Pforzheim (DE)

( * ) Notice: Subject to any disclaimer, the term of this patent is extended or adjusted under 35 U.S.C. 154(b) by 208 days.

(21) Appl. No.: 18/010,654

(22) PCT Filed: Jun. 17, 2021

(86) PCT No.: PCT/EP2021/066522
§ 371 (c)(1),
(2) Date: Dec. 15, 2022

(87) PCT Pub. No.: WO2021/255211
PCT Pub. Date: Dec. 23, 2021

(65) Prior Publication Data
US 2023/0139989 A1    May 4, 2023

(30) Foreign Application Priority Data

Jun. 19, 2020  (EP) .................................... 20181006

(51) Int. Cl.
*G06T 19/00*  (2011.01)
*G06F 3/01*  (2006.01)
(Continued)

(52) U.S. Cl.
CPC .............. *G06T 19/00* (2013.01); *G06F 3/012* (2013.01); *G06F 3/013* (2013.01); *G06T 7/75* (2017.01);
(Continued)

(58) Field of Classification Search
CPC  G06T 19/00; G06T 7/75; G06T 15/04; G06T 17/00; G06T 2207/10016;
(Continued)

(56) References Cited

U.S. PATENT DOCUMENTS 6,806,898 B1  10/2004  Toyama et al.
7,515,174 B1   4/2009  Francisco et al.
(Continued)

FOREIGN PATENT DOCUMENTS

WO  WO2011/148366 A1  12/2011
WO  WO2014/178047 A1  11/2014

OTHER PUBLICATIONS

International Search Report from corresponding International Patent Application No. PCT/EP21/066522, dated Sep. 22, 2021.

*Primary Examiner* — Sing-Wai Wu
(74) *Attorney, Agent, or Firm* — Renner, Otto, Boisselle & Sklar, LLP

(57) ABSTRACT

A video conferencing method comprising a first and a second video conferencing device. In each video conferencing device, video images of a user are captured, transmitted to the other, remote video conferencing device, and displayed there by a display device. The invention further relates to a video conferencing system comprising a first video conferencing device having a first display device and a first image capture device, and comprising a second video conferencing device having a second display device and a second image capture device.

15 Claims, 5 Drawing Sheets

(51) Int. Cl.
*G06T 7/73* (2017.01)
*G06T 15/04* (2011.01)
*G06T 17/00* (2006.01)
*H04L 12/18* (2006.01)
*H04N 7/14* (2006.01)
*H04N 7/15* (2006.01)
*G06V 40/16* (2022.01)

(52) U.S. Cl.
CPC .............. *G06T 15/04* (2013.01); *G06T 17/00* (2013.01); *G06T 2207/10016* (2013.01); *G06T 2207/10024* (2013.01); *G06T 2207/20081* (2013.01); *G06T 2207/20084* (2013.01); *G06T 2207/30168* (2013.01); *G06T 2207/30201* (2013.01); *G06T 2219/024* (2013.01); *G06V 40/174* (2022.01); *H04L 12/1813* (2013.01)

(58) Field of Classification Search
CPC . G06T 2207/10024; G06T 2207/20081; G06T 2207/30201; G06T 2219/024; G06T 2207/20084; G06T 2207/30168; G06F 3/012; G06F 3/013; G06V 40/174
See application file for complete search history.

(56) References Cited

U.S. PATENT DOCUMENTS

| 8,908,008 | B2 | 12/2014 | Tan et al. |
| 2013/0070046 | A1* | 3/2013 | Wolf ....................... G06F 3/013 382/190 |
| 2014/0098179 | A1 | 4/2014 | Moore |
| 2015/0193718 | A1* | 7/2015 | Shaburov ......... G06Q 10/06393 705/7.39 |

* cited by examiner

VIDEOCONFERENCE METHOD AND VIDEOCONFERENCE SYSTEM

FIELD OF INVENTION

The present invention relates to a video conferencing method comprising a first and a second video conferencing device. In each video conferencing device, video images of a user are captured, transmitted to the other, remote video conferencing device, and displayed there by a display device. The invention further relates to a video conferencing system comprising a first video conferencing device having a first display device and a first image capture device, and comprising a second video conferencing device having a second display device and a second image capture device.

BACKGROUND OF INVENTION

In a video conference, the problem arises that there is no direct eye contact between the users. In this respect, the situation of a video conference differs from a situation in which the two users are sitting directly opposite each other. Specifically, when the first user is looking at the depiction of the second user on their display device, the first user does not look into the image capture device, such that when the first user is depicted at the display device of the second user, this first user is depicted in such a way that they do not look into the eyes of the second user. Conversely, if the first user looks into the image capture device so that when the first user is depicted on the display device of the second user there is eye contact between the users, the first user can only peripherally register the depiction of the second user on their display device.

In order to allow eye contact between users during a video conference, EP 0 970 584 B1 proposes placing cameras in openings of the screen. It is also proposed to capture partial images of a room using two cameras. These partial images are joined together in a video processing unit to produce a single image on a screen from the signals coming from both cameras.

Similarly, U.S. Pat. No. 7,515,174 B1 describes a video conferencing system in which user eye contact is established by using multiple cameras, the image streams of which are superimposed on each other.

Furthermore, U.S. Pat. No. 8,908,008 B2 describes a method in which images of the first user are captured through a display by means of a camera, the display being located between the first user and the camera. An image stream of the second user is received from the display. The images of the second user are shifted so that the depiction of the face of the second user is aligned with the eyes of the first user and the lens of the camera.

A disadvantage of known video conferencing methods and video conferencing systems is that the mutual eye contact of the users can only be provided with a large hardware effort. Either several cameras are provided to capture a user or special requirements are placed on the display device so that, for example, video images of the user can be captured through the display device.

SUMMARY OF INVENTION

In accordance with the invention, problems of the prior art are solved by a video conferencing method having the features of the independent method claim(s) and a video conferencing system having the features of the independent system claim(s). Advantageous embodiments and developments can be found in the dependent claims.

Accordingly, in the video conferencing method according to the invention, first video image data are reproduced by a first video conferencing device by means of a first display device and at least a region of the head of a first user comprising the eyes is captured by a first image capture device in a position in which the first user is looking at the video image data reproduced by the first display device. In this case, the video image data reproduced by the first display device comprise at least a depiction of the eyes of a second user captured by a second image capture device of a second video conferencing device arranged remotely from the first video conferencing device. A processing unit receives and modifies the video image data of at least the region of the head of the first user comprising the eyes, captured by the first image capture device. The modified video image data are transmitted to and reproduced by a second display device of a second video conferencing device. In the video conferencing method according to the invention, the direction of gaze of the first user is detected during processing of the video image data. In the video image data, at least the reproduction of the region of the head comprising the eyes is then modified so that a target direction of gaze of the first user depicted in the modified video image data appears as if the first image capture device were arranged on a straight line passing through a first surrounding region of the eyes of the first user and through a second surrounding region of the eyes of the second user depicted on the first display device.

The first or second surrounding region includes in particular the depicted eyes of the first or second user. The first or second surrounding region can, for example, be the distance from the first depicted eye to the second depicted eye of the first or second user. The surrounding region can also include areas to the right and left as well as above and below this distance.

The video conferencing method according to the invention can advantageously be carried out with hardware of a conventional video conferencing system. It can thus be carried out in particular purely on the software side in that data are received by the corresponding image capture device and data are transmitted to the corresponding display device. In accordance with the invention, for this purpose the first image capture device is shifted virtually into another perspective purely on the software side. This is done by generating a fictitious video image from the video image captured by the real image capture device, in particular by means of artificial intelligence methods, the fictitious video image being close to the image that the image capture device would see if it were installed close to the depiction of the eyes of the second user.

However, the modification of the video image data reproducing at least the eyes of the user creates a modified video image in which the first user has a target direction of gaze that is directed towards the first image capture device, even though the first user is not actually looking into the first image capture device but instead, for example, at a display on the first display device. For the second user, the reproduction of the modified video image data of the first user on the second display device then appears in such a way that the direction of gaze of the first user appears as if they were facing the second user. If the first user looks into the eyes of the second user shown on the first display device, there is direct eye contact when the modified video image data of the first user are depicted on the second display device. If the first user is looking at a different region of the depiction on the first display device, then when the modified video image data are depicted, the line of sight of the first user, as depicted by the second display device, is turned away from the second user in the same manner as it would appear if the first user were facing the second user. In this way, a video conferencing method can be provided with little hardware effort, which lies only in the processing unit, giving the second user the impression that the first user is actually sitting opposite them. In particular, direct eye contact is established here when the first user looks into the depiction of the eyes of the second user on the first display device.

In particular, in the video image data, the reproduction of the region of the head of the first user comprising the eyes is modified such that the target direction of gaze of the first user in the modified video image data appears as if the first image capture device were positioned on a straight line passing through one of the eyes of the first user and through one of the eyes of the second user depicted on the first display device. In particular, the video image data are modified so that the target direction of gaze of the first user appears in the modified video image data as if the first image capture device were positioned on this straight line behind or at one of the eyes of the second user depicted on the first display device. In this way, the target direction of gaze of the first user in the modified video image data can more realistically give the impression that the first user is sitting opposite the second user.

According to a development of the video conferencing method according to the invention, it is determined by means of the detected direction of gaze of the first user whether the first user is looking at a point of the first display device, and, if it has been determined that a point of the first display device is being looked at, it is determined which object is currently being depicted at this point by the first display device. In particular, this makes it possible to distinguish whether the first user is looking at a face depicted by the first display device or whether the first user is looking at another object depicted by the first display device.

If it has been determined that the object is the depiction of the face of the second user, when the video image data are processed, the target direction of gaze of the first user depicted in the modified video image data appears to be such that the first user is looking at the face of the second user depicted on the first image capture device. In particular, if the depicted image of the second user is sufficiently large, it is possible to distinguish in the target direction of gaze where in the depicted face of the second user the second user is looking. In this case, the position of the eyes, the nose and/or the mouth in the depiction of the second user can be determined by means of object recognition methods that are known per se. The target direction of gaze of the first user is then oriented in the modified video image data in such a way that the first user is looking at the corresponding region of the depicted face of the second user.

According to another embodiment of the video conferencing method according to the invention, when the video image data are processed, the target direction of gaze of the first user depicted in the modified video image data appears such that the first user is looking at an eye of the second user depicted on the first display device if it has been determined that the object is the depiction of the face of the second user, but it has not been determined which region of the depiction of the face is being looked at. In this case, direct eye contact is thus established by the modified video image data when the first user is looking at the depicted face of the second user on the first display device.

According to a development of the video conferencing method according to the invention, the video image data reproduced by the first display device comprise at least a depiction of the eyes of a plurality of second users captured by the second image capture device and/or further second image capture devices. In this case, it is determined whether the object is a depiction of the face of a particular one of the plurality of second users. When the video image data are processed, the target direction of gaze of the first user depicted in the modified video image data then appears as if the first image capture device were arranged on the straight line passing through a first surrounding region of the eyes of the first user and through a second surrounding region of the eyes of the particular one of the plurality of second users depicted on the first display device.

This development of the video conferencing method according to the invention comprises the constellation in which a plurality of users participate in the video conference at the second video conferencing device, the second users being captured by the same image capture device or, if applicable, being captured at different locations by separate image capture devices. The target direction of gaze of the first user is then formed in the modified video image data such that the second user viewed on the first display device sees on his second display device that he is being looked at by the first user. The other second users, on the other hand, see on their second display devices that they are not being looked at.

There are various ways to modify the video image data and adjust the direction of gaze of the first user in the modified video image data to match the desired target direction of gaze. For example, when processing the video image data, the modified video image data can be generated by an artificial intelligence method. In particular, a so-called Generative Adversarial Network (GAN) or a method developed therefrom can be used.

According to one embodiment of the video conferencing method according to the invention, during the processing of the video image data, the modified video image data are accordingly generated by a Generative Adversarial Network (GAN) with a generator network and a discriminator network. In this process, the generator network generates modified video image data. The discriminator network evaluates a similarity between the depiction of the head of the first user in the modified video image data and the captured video image data. Further, the discriminator network evaluates a match between the direction of gaze of the first user in the modified video image data and the target direction of gaze. In particular, through iterative steps, modified video image data may be generated in this manner that include a depiction of the first user that is very similar to the first user, but with the captured direction of gaze changed to the target direction of gaze. It has been found that, when using a Generative Adversarial Network, modified video image data can be generated which contain a depiction of the head of the first user which is close to reality, the direction of gaze of the depiction of the first user in the modified video image data fitting into the depiction of the head in such a way that the depiction of the head of the first user continues to be close to reality. In particular, there are no artefacts at the transition of the region directly surrounding the eyes, which in particular determines the target direction of gaze, to adjoining regions of the depiction of the head.

According to a development of the video conferencing method according to the invention, the video image data captured by the first image capture device and comprising at least a depiction of the head of the first user are analysed by means of the processing unit in such a way that an emotion expression of the first user is detected and assigned to one or more emotion expression class(es). In this case, the discriminator network further evaluates a match between the emotion expression class(es) of the depiction of the head of the first user in the modified video image data and the associated emotion expression class(es) of the depiction of the head of the first user in the captured video image data. In this way, it can be achieved that the Generative Adversarial Network not only maintains a similarity of the depiction of the head of the first user, but also leaves the emotion expression of the depiction of the first user unchanged. For example, the processing unit may assign a smile, a grin and/or a sad face of the first user to different emotion expression classes. The discriminator network then ensures that, even in the modified video image data, the depiction of the head of the first user shows a smile, a grin and/or a sad face.

In a video conference, not only the eye contact between the users is of particular importance, but also the gestures, facial expressions and the emotion expression, which is determined, for example, by a facial expression of the user in question. The emotion expression of the first user conveyed by the facial expression is retained during the processing of the video image data in this development of the video conferencing method according to the invention, so that the conversation of the users is not impaired by the modification of the video image data of the first user.

According to another embodiment of the video conferencing method according to the invention, during the processing of the video image data, a direction of gaze region representing the eyes of the first user is extracted from a remaining region, thereby generating video image partial data. This direction of gaze region is then modified in the video image partial data so that the direction of gaze of the first user given by the depiction of the eyes appears in the modified video image partial data of this direction of gaze region as if the first image capture device were arranged on the straight line. Then, the modified video image partial data of the direction of gaze region are reinserted into the remaining region of the video image data, thereby generating the modified video image data. Advantageously, this embodiment of the video conferencing method ensures that a remaining region outside the direction of gaze region remains unchanged in the modified video image data. In this way, it can be ensured in a different way that the facial expression or the emotion expression of the first user is preserved in the modified video image data and only the direction of gaze is modified.

In particular, the direction of gaze region of the video image data can be divided into a first sub-region comprising the depiction of a first eye of the first user and a second sub-region comprising the depiction of a second eye of the first user.

According to another embodiment, the direction of gaze region of the video image data comprises a depiction of a head of the first user. The remaining region then comprises a background of the depiction of the head. In this case, the direction of gaze of the depiction of the first user is changed by changing the depiction of the head of the first user. For example, the depiction of the head can be rotated to change the direction of gaze of the depiction of the first user.

According to a development of the video conferencing method according to the invention, a plurality of images of the first user are initially captured and stored, in which the direction of gaze region of the first user defines different directions of gaze without changing the pose of the head of the first user. In this case, the changed target direction of gaze of the first user to be generated by processing the video image data is compared with the directions of gaze of the stored images. An image is then selected in which the direction of gaze comes closest to the changed target direction of gaze of the first user to be generated. When processing the video image data, the selected image is used to generate the modified video image partial data and/or video image data. In this way, a very realistic depiction of the first user can be generated in the modified video image data, as the modified video image data correspond to an image initially captured from the first user and stored.

In a corresponding manner, different facial expressions or emotion expressions of the first user can also be initially captured and stored. When selecting the image, not only is it taken into account that the direction of gaze in the depiction of the first user in the image corresponds to the target direction of gaze, but also that the facial expressions or emotion expressions in the captured depiction of the first user and the image match.

The initial capture of the images of the first user can be implemented, for example, by the first user looking at different points on the first display device. Here, the direction of gaze of the first user is captured and stored together with the captured images.

According to a development of the video conferencing method according to the invention, the modified video image partial data of the direction of gaze region can be reinserted into the remaining region of the video image data in such a way that the modified video image data are generated by artificial intelligence methods such that an image natural for human perception results. Again, a Generative Adversarial Network can be used for this.

According to a further embodiment of the video conferencing method according to the invention, the direction of gaze region is divided into a peripheral zone, an eye zone comprising the depiction of the iris including the pupil of at least one of the eyes of the first user, and a transition zone between the peripheral zone and the eye zone. During processing of the video image data, the direction of gaze region is then changed such that the eye zone is changed such that the target direction of gaze of the depiction of the first user in the modified video image data of the eye zone appears as if the first image capture device were arranged on the straight line, the depiction in the peripheral zone seamlessly adjoining the depiction of adjacent regions of the remaining region, and in the transition zone the video image data being modified such that there is a transition from the modified depiction in the eye zone to the depiction in the peripheral zone. In this way, a natural appearance of the depiction of the first user with the target direction of gaze can be generated.

According to a further embodiment of the video conferencing method according to the invention, the video image data captured by the first image capture device comprise at least a depiction of the head of the first user. Furthermore, the pose of the head of the first user is determined in the captured video image data and the direction of gaze of the first user is then detected from the determined pose of the head of the first user. This allows the first user's direction of gaze to be easily detected as the position of the pupils does not need to be determined. The direction of gaze is obtained only from the pose of the head.

According to a development of the video conferencing method according to the invention, the following steps are carried out during the processing of the captured video image data:

a) creating a deformable three-dimensional model of the head of the first user,
b) projecting the captured video image data into the created three-dimensional model of the first user so as to create a first three-dimensional representation of the head of the first user captured by the first image capture device, said first three-dimensional representation having at least one gap region resulting from occluded regions of the head of the first user that are not visible in the captured video image data,
c) calculating a texture to fill the gap region,
d) generating a second three-dimensional representation of the head of the first user, in which the gap region is filled with the calculated texture, and
e) modifying the captured video image data in such a way that the head of the first user is depicted by the second three-dimensional representation such that the target direction of gaze of the head of the first user in the modified video image data of the first user appears as if the first image capture device were arranged on a straight line passing through a first surrounding region of the eyes of the first user and through a second surrounding region of the eyes of the second user depicted on the first display device.

The three-dimensional model of the head generated in step a) comprises in particular parameterised nodal points, so that the three-dimensional model of the head is defined by a parameter set comprising a plurality of parameters.

The parameters for the three-dimensional model generated in step a) comprise, in particular, head description parameters and facial expression parameters, the head description parameters being determined individually for different users and the facial expression parameters being determined for the captured video image data. In particular, the facial expression parameters are determined anew for each video frame of the captured video image data.

According to a development of the video conferencing method according to the invention, the second representation of the head of the first user does not comprise a three-dimensional representation of body parts of which the size is smaller than a limit value. These body parts are then depicted as a texture in the second representation. For example, the limit value is in a range of 1 mm to 3 mm. For example, the pupils, eyelids and/or eyebrows are depicted only as a texture.

In particular, the head description parameters and the facial expression parameters each comprise coefficients.

According to a development of the video conferencing method according to the invention, the coefficients of the head description parameters are obtained by a machine learning procedure in which a correction of coefficients of the head description parameters is calculated by a projection of the depiction of the head of the first user contained in the captured video image data into the three-dimensional model of the head of the first user.

In this case, the training of the machine learning procedure in particular does not take into account the at least one gap region. For example, the loss function of a neural network does not include the gap region in the training.

According to a development of the video conferencing method according to the invention, during the correction of the head description parameters, the projection of the depiction of the head of the first user contained in the captured video image data into the three-dimensional model of the head of the first user is subjected to a geometric modelling process to produce a two-dimensional image representing the projection into the three-dimensional model. Such a geometric modelling process is also referred to as UV mapping. Thus, no Generative Adversarial Network (GAN) is used in this case. Instead, a UV mapping is carried out.

Specifically, the head description parameters can be obtained in particular by a machine learning procedure trained as follows:
generating test coefficients for a start vector and a first and second head description parameter and a first and second facial expression description parameter, the test coefficients for the first and second head description parameters and the first and second facial expression description parameters being identical except for, in each case, a coefficient to be determined,
generating a test depiction of a head with the test coefficients for the start vector and the second head description parameter and the second facial expression description parameter,
retrieving an image colour for each nodal point with the test coefficients for the start vector and the first head description parameter and the first facial expression description parameter, and
inputting the retrieved image colours into the machine learning procedure and optimising the parameters of the machine learning procedure so that the difference between the result of the machine learning procedure and the coefficient to be determined of the second head description and facial expression description parameters is minimised.

According to a development of the video conferencing method according to the invention, in step c) colours of the gap region are predicted by means of a machine learning procedure using colours of the captured video image data.

In particular, in step c), when calculating a texture to fill the gap region, a geometric modelling process is performed to create a two-dimensional image representing the projection, obtained in step b), into the three-dimensional model, and the created two-dimensional image is used to train a Generative Adversarial Network (GAN).

It has proven advantageous not to calculate the modified video image data with a GAN alone, as artefacts may occur. The use of a GAN to calculate the modified video image data is difficult to control. Advantageously, therefore, in accordance with the invention, the GAN is only used to fill the gap region in the three-dimensional model. For this purpose, a two-dimensional image obtained by UV mapping is again used to then train a Generative Adversarial Network (GAN).

Specifically, the texture for filling the gap region in step c) can be calculated in particular by a machine learning procedure trained with the following steps:
c1) providing a video frame from training video image data,
c2) estimating parameters of the three-dimensional model of the head of the first user (5),
c3) projecting the provided video frame into the three-dimensional model of the first user (5) with the estimated parameters,
c4) creating a two-dimensional image representing the projection created in step c3) and containing the gap region,
c5) creating a modified two-dimensional image by applying a masking to the two-dimensional image created in step c4), the gap region being enlarged by the masking,
c6) inputting the modified two-dimensional image created in step c5) into the Generative Adversarial Network (GAN) training, the difference of the two-dimensional image and of the modified two-dimensional image being considered in the loss function.

In the method according to the invention, the captured video image data are modified so that the head of the first user is depicted such that the target direction of gaze appears as if the first image capture device were arranged on a straight line passing through a first surrounding region of the eyes of the first user and through a second surrounding region of the eyes of the second user depicted on the first display device. For this purpose, the three-dimensional model is rotated to bring the head into a position with the desired direction of gaze. One challenge here is that of preserving the facial expression. In this respect, the rotation of the three-dimensional model deviates from pure rotation. In accordance with the invention, statistical background information is used to preserve the facial expression during rotation. For example, information can be used that lowering the chin also changes other parts of the face in a certain way. This statistical background information can then be used to change other facial areas differently from the pure geometric rotation. In accordance with the invention, a deformable three-dimensional model with information about the facial expression is thus created.

According to a development of the video conferencing method according to the invention, successive video frames are captured by the first image capture device and stored at least temporarily. When processing the video image data, missing image elements of the remaining region are then taken from stored video frames. Alternatively, the missing image elements of the remaining region can be synthesised, for example by artificial intelligence procedures. When changing the direction of gaze during the depiction of the first user, parts of the image may become visible that were not visible during the captured depiction of the first user. Such missing image regions must be supplemented in order to continue to achieve a realistic depiction. These additions can advantageously be taken from previously stored video frames or they can be synthesised.

According to another embodiment of the video conferencing method according to the invention, successive video frames are captured by the first image capture device and, when the direction of gaze of the first user changes, some video frames are interpolated during the processing of the video image data in such a way that the change in direction of gaze reproduced by the modified video image data is slowed down. Particularly in a conversation with several interlocutors, changes in direction of gaze may appear too sudden, for example, when the head is turned. In order to make such a movement appear natural when the direction of gaze is changed, some video frames can be interpolated, which slows down the movement when the direction of gaze is changed.

As with conventional video conferencing methods, the modified video image data is reproduced by the second display device in real time or near real time. There may be only a slight latency caused by the transmission and processing of the video image data to the other video conferencing device.

Furthermore, in the video conferencing method, in particular not only are the video image data captured by the first image capture device processed for depiction on the second display device in such a way that the direction of gaze changes when the first user is depicted, but the video image data of the second user captured by the second image capture device are also modified accordingly for the reproduction on the first display device. In this way, the particular depictions on the two display devices result in a very realistic depiction of the other user in each case, in particular with regard to their direction of gaze and optionally also with regard to their emotion expression or facial expression.

The video conferencing system according to the invention comprises a first video conferencing device having a first display device and a first image capture device, the first image capture device being arranged to capture at least a region of the head of a first user, said region comprising the eyes, in a position in which the first user is looking at the video image data reproduced by the first display device. Further, the video conferencing system comprises a second video conferencing device remotely located from the first video conferencing device, coupled to the first video conferencing device for data exchange, and having a second display device for displaying video image data captured by the first image capture device. Further, the video conferencing system comprises a processing unit which is coupled to the first image capture device and which is configured to receive and process the video image data captured by the first image capture device and to transmit the processed video image data to the second display device of the second video conferencing device. In the video conferencing system according to the invention, the processing unit is configured to detect the direction of gaze of the depicted first user when processing the video image data, to modify in the video image data at least the reproduction of the region of the head of the first user comprising the eyes such that the target direction of gaze of the first user appears in the modified video image data as if the first image capture device were arranged on a straight line passing through a first surrounding region of the eyes of the first user and through a second surrounding region of the eyes of the second user depicted on the first display device.

The video conferencing system according to the invention is in particular configured to carry out the video conferencing method described above. It thus has the same advantages.

Further, the invention relates to a computer program product, comprising instructions which, when the program is run by a computer, prompt the computer to carry out the method described above, of the first and second video conferencing devices.

BRIEF DESCRIPTION OF DRAWINGS

In the following, exemplary embodiments of the invention are explained with reference to the drawings.

DETAILED DESCRIPTION OF INVENTION

Figure 1:
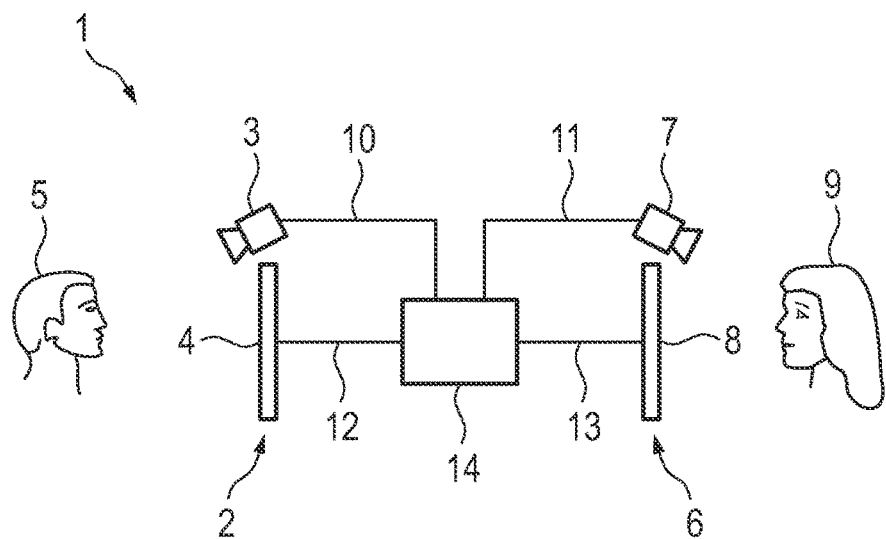
FIG. 1 shows the structure of an exemplary embodiment of the video conferencing system according to the invention.
Figure 2:
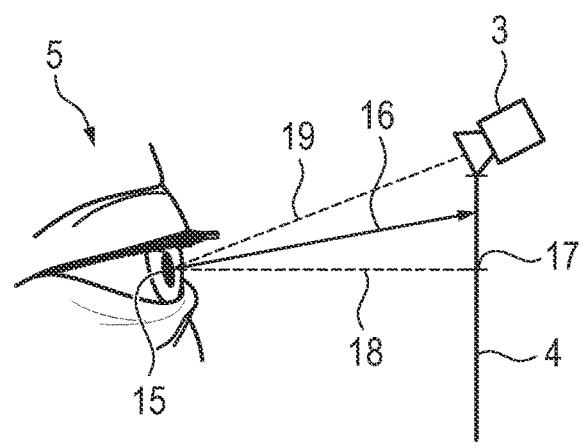
FIG. 2 illustrates the geometry of the direction of gaze of the first user.
Figure 3:
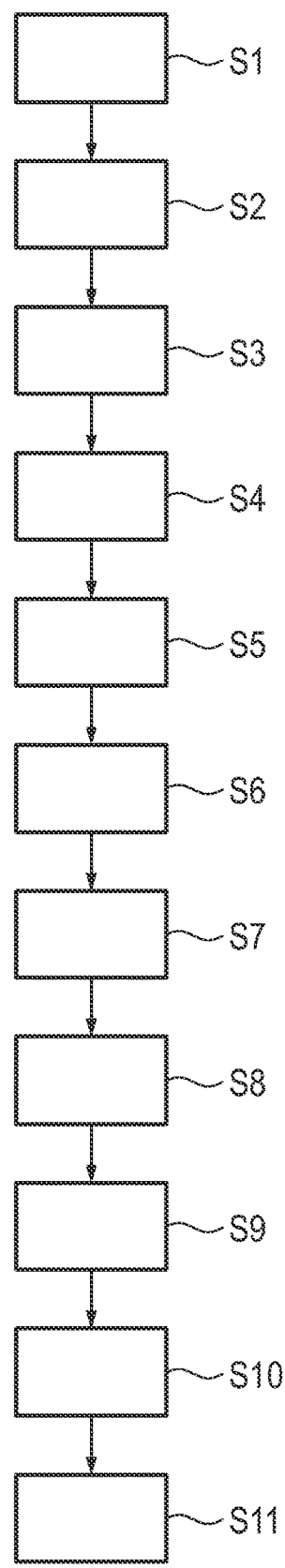
FIG. 3 shows the sequence of a first exemplary embodiment of the method according to the invention.

With reference to FIGS. 1 and 2, the exemplary embodiment of the video conferencing system 1 according to the invention is explained:

The video conferencing system 1 comprises a first video conferencing device 2 with a first image capture device 3, for example a first camera, and a first display device 4, for example a display with a display surface. In the capture direction of the first image capture device 3, there is a first user 5 who can view the reproduction of the first display device 4 while being captured by the first image capture device 3. In the exemplary embodiment, at least the head of the first user 5 is captured by the first image capture device 3.

At a distance from the first video conferencing device 2 there is arranged a corresponding second video conferencing device 6. This comprises a second image capture device 7, which can also be formed as a camera, and a second display device 8, for example a display with a display surface. In front of the second video conferencing device 6 is a second user 9 who can be captured by the second image capture device 7 while simultaneously looking at the reproduction of the second display device 8.

The two image capture devices 3 and 7 and the two display devices 4 and 8 are coupled to a processing unit 14 via the data connections 10 to 13. The data connections 10 to 13 can at least partly be remote data connections, for example via the Internet. The processing unit 14 can be located at the first video conferencing device 2, the second video conferencing device 6 or at a separate server. The processing unit 14 can be located at the first or second video conferencing device 2, 6. Furthermore, it can be located at a central server or can be divided among a plurality of servers or processing units, for example one processing unit for each user. Furthermore, the processing unit 14 could be divided between units at the first and the second video conferencing device 2, 6 and optionally a separate server, so that the video image data are captured at one video conferencing device and the processing of the video image data takes place at the other video conferencing device and/or the separate server.

Furthermore, instead of the video image data, it may be that only metadata are transmitted, from which only the second video conferencing device 6 on the receiver side then synthesises the video image data to be displayed. Such compression could reduce the bandwidth for the data transmission.

As shown in FIG. 2, the first user 5 is looking at a point on the first display device 4 with one of their eyes in a direction of gaze 16 starting from the position 15. In doing so, the first image capture device 3 can capture the first user 5 from a capture direction 19. At the same time, the first display device 4 can reproduce video image data, captured by the second image capture device 7, of the head of the second user 9 during a video conference. At least one eye of the second user 9 at a position 17 is depicted by the first display device 4.

The processing unit 14 is configured to receive and process the video image data captured by the first image capture device 3 and to transmit the processed video image data to the second display device 8 of the second video conferencing device 6 so that the second display device 8 can display this processed video image data. Similarly, the processing unit 14 is configured to receive and process the video image data captured by the second image capture device 7 and to transmit the processed video image data to the first display device 4 of the first video conferencing device 2, which can then reproduce the processed video image data. As will be explained below with reference to the embodiments of the methods according to the invention, the processing unit 14 is configured here to detect the direction of gaze 16 of the depicted first user 5 during the processing of the video image data and to modify the reproduction of a region 20 of the head of the first user 5, said region comprising the eyes, in the video image data in such a way that a target direction of gaze of the first user 5 appears in the modified video image data as if the first image capture device 3 were on a straight line 18 passing through one of the eyes of the first user 5 and through one of the eyes of the second user 9 depicted on the first display device 4.

In the following, a first exemplary embodiment of the method according to the invention is explained, wherein the design of the video conferencing system according to the invention, in particular the processing unit 14, is further described.

In a step S1, the head of the first user 5 is captured by the first image capture device 3. At the same time, in a step S2, video image data comprising a depiction of the head of the second user 9 is reproduced by the first display device 4. These video image data are captured by the second image capture device 7 and, if necessary, modified by the processing unit 14. The video image data displayed by the first display device 4 shows an eye of the second user 9 at position 17 (see FIG. 2).

In a step S3, the video image data captured by the first image capture device 3 are transmitted to the processing unit 14 via the data link 10.

In a step S4, the depiction of the face of the first user 5 is extracted in the video image data received by the processing unit 14.

In a step S5, the direction of gaze of the first user 5 is detected based on the extracted depiction of the face. Eye tracking methods known per se can be used for this.

In a step S6, the current position 17 of the depiction of an eye of the second user 9 on the first display device 4 is determined. Alternatively, the midpoint between the depiction of the two eyes of the second user 9 can also be determined as point 17. Furthermore, the orientation of the straight line 18 passing through the position 15 of an eye of the first user 5 and the position 17 is calculated. Also in this case, the position 15 could alternatively be defined as the midpoint between the two eyes of the first user 5.

Subsequently, in a step S7, a target direction of gaze is calculated for modified video image data in the depiction of the first user 5. The target direction of gaze is determined here in such a way that the depicted first user appears in the modified video image data as if the first image capture device 3 were arranged on the straight line 18, in particular at the position 17 or on the straight line 18 behind the first display device 4.

Figure 4:
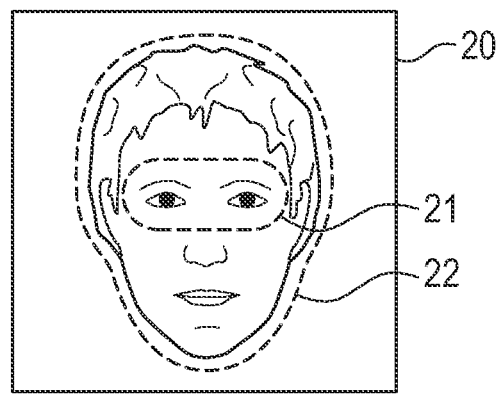
FIG. 4 shows a first division of captured video image data.

In a step S8, the captured region 20 comprising the eyes of the first user 5 is divided, as shown in FIG. 4, into a direction of gaze region 21 comprising the depiction of both eyes of the first user 5 and a remaining region 22 of the extracted face of the first user 5.

In a step S9, the direction of gaze region 21 is modified in the associated video image partial data such that the direction of gaze 16 of the first user 5 specified by the depiction of the eyes appears in the modified video image partial data of this direction of gaze region 21 as if the first image capture device 3 were arranged at the position 17. For this purpose, several images of the first user 5, in which the first user 5 has different directions of gaze 16, may have been initially captured and stored. In these initially captured images of the first user 5, the first user 5 has left the pose of their head unchanged and has only changed the direction of gaze 16 with their eyes. A stored image in which the direction of gaze comes closest to the calculated target direction of gaze of the first user 5 is then selected for the modification of the video image partial data of the direction of gaze region 21. From this stored image, a direction of gaze region corresponding to the direction of gaze region 21 is extracted. The direction of gaze region 21 is then replaced by the extracted direction of gaze region. Alternatively, the modified video image partial data of the direction of gaze region 21 can also be synthesised by artificial intelligence procedures.

In a step S10, the modified video image partial data of the direction of gaze region 21 are re-inserted into the remaining region 22 of the depiction of the face of the first user 5. The remaining region 22 with the inserted modified video image partial data of the direction of gaze region 21 is then inserted into another remaining region of the video image data of the first image capture device 3, thereby generating the modified video image data.

In a step S11, the processing unit 14 transmits the modified video image data via the data link 13 to the second display device 8, which displays the modified video image data. These can then be viewed by the second user 9. The direction of gaze of the depiction of the first user 5 on the second display device 8 then appears in a manner as if one of the eyes of the second user 9 were at the position 17 opposite the first user 5. A very realistic depiction of the first user 5 is thus generated on the second display device 8. In this case, if the first user 5 looks directly at the depiction of an eye of the second user 9 at position 17, there is also eye contact with the second user 9 when the first user 5 is depicted on the second display device 8. Even if the direction of gaze 16 of the first user 5 is directed to another position of the first display device 4 or even outside the first display device 4, this direction of gaze is reproduced by the second display device 8 as if the first image capture device were arranged at the depicted eye of the second user 9.

Figure 5:
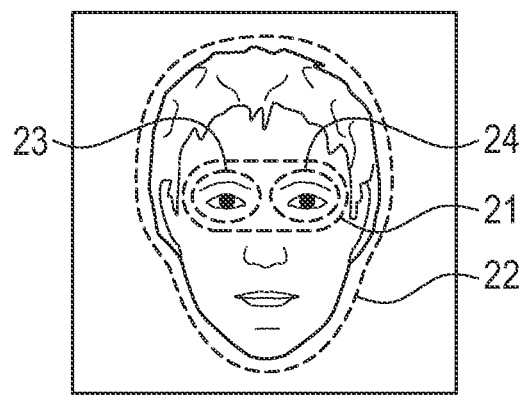
FIG. 5 shows a second division of captured video image data.

In another embodiment of the first exemplary embodiment of the method according to the invention, in step S8 the direction of gaze region 21 is additionally divided, as shown in FIG. 5, into a first sub-region 23, which comprises the depiction of a first eye of the first user 5, and a second sub-region 24, which comprises the depiction of a second eye of the first user. In step S9, the sub-regions 23 and 24 are then modified so that the target direction of gaze of the first user 5 results.

Figure 6:
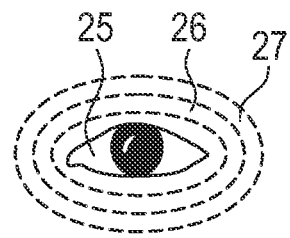
FIG. 6 shows a division of a direction of gaze region.

As shown in FIG. 6, each sub-region 23 and 24 of the direction of gaze region 21 is divided into an eye zone 25, a transition zone 26 and a peripheral zone 27. Here, the eye zone 25 comprises the depiction of the pupil and the iris of the particular eye of the first user 5. The transition zone 26 is arranged between the peripheral zone 27 and the eye zone 25. In step S9, the eye zone 25 is modified so that the target direction of gaze of the depiction of the first user 5 results in the modified video image data of the eye zone 25. The video image data for the depiction of the peripheral zone 27 are not modified or are only insignificantly modified so that it seamlessly adjoins the depiction of adjacent regions of the direction of gaze region 21 or the remaining region 22. The video image data for the transition zone 26 are modified so that there is a transition from the modified depiction of the eye zone 25 to the depiction in the peripheral zone 27.

Figure 7:
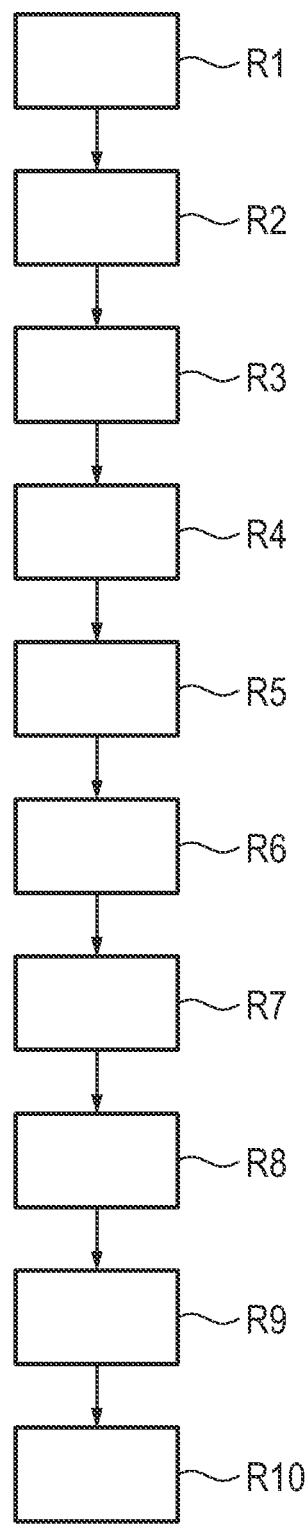
FIG. 7 shows the sequence of a second exemplary embodiment of the method according to the invention.

In the following, a second exemplary embodiment of the method according to the invention is described with reference to FIG. 7. In conjunction with the second exemplary embodiment of the method according to the invention, an alternative embodiment of the processing unit 14 according to a second exemplary embodiment of the video conferencing system 1 according to the invention is described:

First, steps R1 to R7 are carried out, which correspond to steps S1 to S7 described above.

In a step R8, the extracted depiction of the face of the first user 5 is analysed such that an emotion expression of the first user 5 is detected by means of the face expression. This emotion expression is assigned in the processing unit 14 to an emotion expression class.

In a step R9, the modified video image data of the depicted first user 5 are generated, in which the direction of gaze of the first user 5 corresponds to the target direction of gaze. For this purpose, in the second exemplary embodiment of the method according to the invention, a Generative Adversarial Network (GAN) is used, which is implemented in the processing unit 14. This Generative Adversarial Network comprises a generator network and a discriminator network. The generator network generates modified video image data. The discriminator network evaluates a similarity between the depiction of the head of the first user 5 in the modified video image data generated by the generator network and the video image data captured by the first image capture device 3. Further, the discriminator network evaluates a match between the direction of gaze of the first user 5 in the modified video image data generated by the generator network and the target direction of gaze. The discriminator network provides feedback to the generator network, wherein the greater the similarity of the depiction of the head of the first user in the modified video image data to the captured video image data, the more positively modified video image data are evaluated, and the greater the match between the direction of gaze of the first user in the modified video image data and the target direction of gaze.

Furthermore, the discriminator network evaluates a match between the emotion expression class of the depiction of the head of the first user 5 in the modified video image data and the associated emotion expression class of the depiction of the head of the first user 5 in the captured video image data. The closer the match, the more positive the evaluation of the discriminator network. This rating is also transferred from the discriminator network to the generator network. Depending on the evaluations of the discriminator network, the generator network again generates modified video image data in an iterative process. In this way, modified video image data are generated in which there is a high degree of similarity between the depiction of the head and the captured video image data, but in which the direction of gaze of the first user corresponds to the target direction of gaze and in which the emotion expression of the first user falls into the same emotion expression class as the emotion expression of the first user 5 in the captured video image data.

In a step R10, which corresponds to step S11 of the first exemplary embodiment, the modified video image data are transmitted to the second display device 8, which displays them.

The video image data captured by the first image capture device 3 are divided into successive video frames. The steps of the methods of the first and second exemplary embodiments described above are performed for each successive video frame, so that continuous video images are generated.

In the first exemplary embodiment of the method according to the invention, it may be that image elements are missing due to the modification of the video image data in a remaining region, e.g. the remaining region 22, e.g. due to a rotation of the depiction of the head of the first user 5. Such missing image elements can then be taken from previously captured video frames which show the content of these missing image elements and which are stored at least temporarily for this purpose. Alternatively, such missing image elements can also be synthesised by artificial intelligence procedures.

In addition, during the successive reproduction of the video frames, there may be a depiction of a change of direction of gaze, e.g. of the first user 5, e.g. to another interlocuter. Such a change of direction of gaze is detected by the processing unit 14 in the captured video image data. In this case, some video frames are then interpolated such that the change in direction of gaze reproduced by the modified video image data is slowed down.

In a further exemplary embodiment of the method according to the invention, which can supplement both the first and the second exemplary embodiment, in step S5 or R5 not only the direction of gaze 16 of the first user 5 is detected, but also it is determined which object is currently depicted at the intersection of the direction of gaze 16 with the first display device 4, provided that the direction of gaze 16 impinges on the first display device 4. This object can be determined by the processing unit 14 from the video image data which the processing unit transmits to the first display device 4 via the data link 12. If it has been determined that the object is the depiction of the face of the second user 9, the processing of the video image data determines the target direction of gaze of the first user 5 depicted in the modified video image data such that the first user 5 is looking at the face of the second user depicted on the first display device in the same manner.

On the other hand, if it is not possible to determine which region of the depiction of the face is being looked at by the first user 5, the processing of the video image data determines the target direction of gaze of the first user depicted in the modified video image data such that the first user 5 is looking at an eye of the second user 9 depicted on the first display device 4.

In this case, when video image data comprising a plurality of individuals, e.g. a plurality of second users, are reproduced by the first display device 4, this exemplary embodiment distinguishes which of these depicted users the first user 5 is looking at. The various second users can be jointly captured by the second image capture device 7 or can be captured by separate second image capture devices. It is then determined whether the object is the depiction of the face of a particular one of the plurality of second users. When the video image data are processed, the target direction of gaze of the first user depicted in the modified video image data then appears as if the first image capture device 3 were positioned on the straight line passing through one of the eyes of the first user 5, i.e. position 15, and further passing through one of the depicted eyes of the particular one of the plurality of second users. The modification of the video image data ensures that the depicted interlocutor, to whom the line of sight 16 of the first user 5 is directed, sees that he is being looked at, whereas the other second users see that they are not being looked at.

A third exemplary embodiment of the method according to the invention is described below:

First, steps S1 to S4 are carried out as in the first exemplary embodiment.

In step S5, the direction of gaze of the first user 5 is then detected. However, in the third exemplary embodiment, the pose of the head of the first user 5 is determined on the basis of the captured video image data. The pose of the head is understood to be the spatial position of the head, i.e. the combination of the position and the orientation of the head. In this case, the direction of the first user's gaze is determined from the pose alone.

The captured video image data are then processed as follows:

In a step a), a deformable three-dimensional model of the head of the first user 5 is created. A deformable three-dimensional mesh is used for this. For example, the so-called Basel Face Model can be used. It comprises parameterised nodal points, so that the three-dimensional model of the head is defined by a set of parameters comprising a plurality of parameters. The nodal points are formed by a set of triangles with the nodal points at their corners.

In the present exemplary embodiment, there are approximately 58,000 nodal points. Each nodal point is a three-dimensional vector defined as follows:

$$v_k = v_{Start,k} + S_k s + E_k e$$

Here, $v_k$ is the three-dimensional vector of the k-th nodal point, $v_{Start, k}$ is the start vector of the k-th nodal point, $S_k$ is a head description matrix and $E_k$ is a face description matrix. Furthermore, s is a head description vector and e is a facial expression description vector. The matrix $S_k$ has approximately 200 columns and three rows, i.e. one row for each coordinate axis. The matrix $E_k$ has approximately 100 columns and three rows for the three coordinate axes. The head description vector s has correspondingly approximately 200 coefficients and the facial expression description vector e has correspondingly approximately 100 coefficients. In this way, the parameterisation of the three-dimensional model is described. The head description vector s and the facial expression description vector e are the same for each node k. The head description vector s is the same for each user. However, different users have different head description vectors s. The facial expression description vector e is only identical for each user and for each image, i.e. each video frame. If the facial expression of a user changes from one video frame to the next video frame, the facial expression description vector e also changes.

Figure 8:
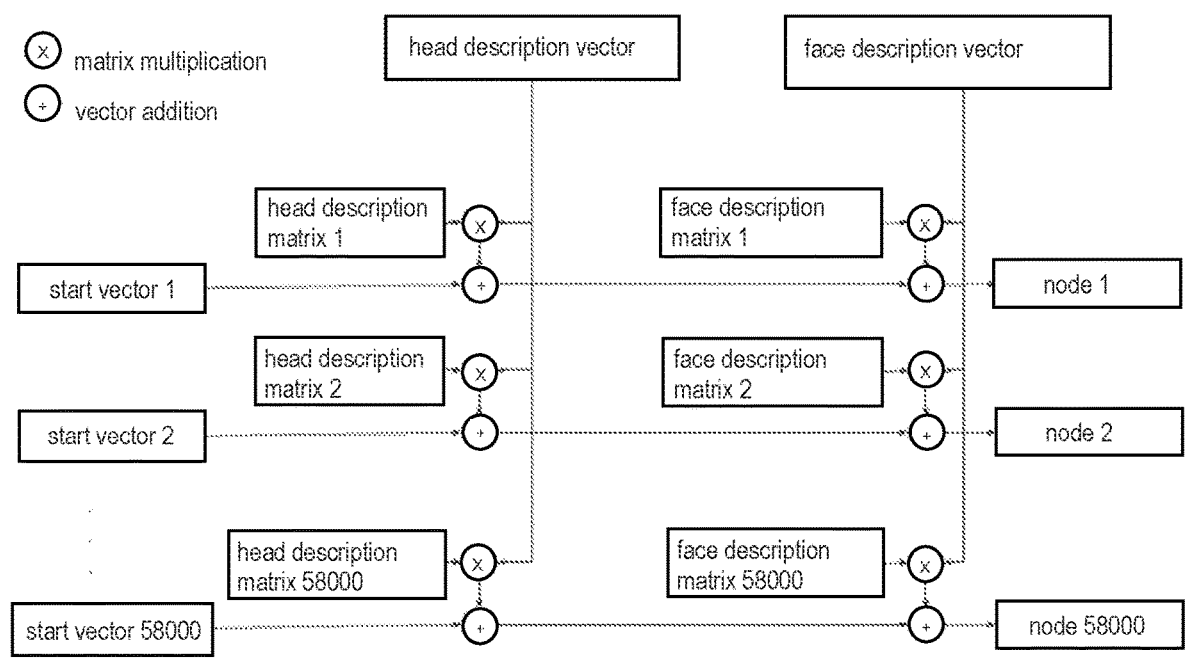
FIG. 8 illustrates the extraction of nodal points in a third exemplary embodiment of the method according to the invention.

The start vector $v_{Start, k}$ and the matrices $S_k$ and $E_k$ differ for each node k. The correction of the nodal points starting from the start vector is calculated by a matrix multiplication with approximately 58,000 different predetermined matrices. The calculation of the three-dimensional vectors for the nodes is illustrated in FIG. 8. Here, the head description vector s, the facial expression description vector e and the vectors for the nodes k are determined; the start vectors and the matrices are constant data that are determined in advance.

The parameters for the three-dimensional model generated in step a) thus comprise head description parameters and facial expression description parameters, the head description parameters being determined individually for different users and the facial expression parameters being determined for the captured video image data.

Through this representation in a three-dimensional model, every human face and every facial expression of a person can be described by the definition of 300 parameters.

There are also six additional parameters for the general orientation of the head in the scene, i.e. the pose of the head. Three of these parameters define the rotation angles and three additional parameters define the translation of a start vector. Any rigid transformation can be depicted by such a 6-tuple.

The position of a nodal point $v_k$ in the scene is then described as follows:

$$v'_k = R v_k + t$$

The constants R and t describe rotations and displacements of the vector $v_k$, from which the vector $v'_k$ results.

It should be noted that the mesh structure formed by the nodal points of the triangle of the mesh is fixed, i.e. all parameterisations of the model have the same triangulation.

In accordance with the invention, different approaches can now be used to determine the approximately 300 parameters, of which approximately 100 parameters must be determined for each video frame, whereas approximately 200 parameters can be assumed to be constant. The parameters should be selected in such a way that the user's head is depicted realistically and with the correct facial expression and pose in each video frame.

In the third exemplary embodiment of the method according to the invention, the coefficients of the head description parameters are obtained by a machine learning procedure. A correction of coefficients of the head description parameters is calculated by projecting the depiction of the head of the first user 5 contained in the captured video image data into the three-dimensional model of the head of the first user 5.

Specifically, R and t are first determined randomly. Furthermore, the coefficients of the head description vectors and the facial expression description vectors $s_1, e_1, s_2, e_2$ are also randomly determined. Here, the components of $s_1, e_1$ and $s_2, e_2$ are the same, except for a single coefficient for which the predictor is trained.

Images are then generated using the three-dimensional model with the parameters R, t, $s_2, e_2$.

An image colour is then obtained for each nodal point k using R, t, $s_1, e_2$, with incorrect coefficients being used here deliberately.

A regression tree is then used to determine the coefficients $s_2, e_2$ which are to be predicted, more specifically based on the image colours of the nodal points which were determined beforehand.

These regression trees are trained to iteratively improve the prediction for a single dimension using the entire previous prediction. This approach differs substantially from prior art approaches that only learn coordinates in two-dimensional space. In other words, a machine learning procedure according to the invention is trained to predict the correction of coefficients of a head description vector, more specifically based on the projection into a three-dimensional model.

In other words, the head description parameters are obtained by a machine learning procedure trained as follows:

Test coefficients are generated for a start vector. Furthermore, test coefficients are generated for a first and second head description parameter and a first and second facial expression description parameter. The test coefficients for the first and second head description parameters and the first and second facial expression description parameters are identical except for one coefficient each to be determined. A test depiction of a head is then generated with the test coefficient for the start vector and the second head description parameter and the second facial expression description parameter. An image colour is then retrieved for each nodal point with the test coefficients for the start vector and the first head description parameter and the first facial expression description parameter. Now, the retrieved image colours are input to the machine learning procedure and the machine learning procedure parameter is optimised to minimise the difference of the machine learning procedure result, i.e. the coefficients determined by the machine learning procedure, to the coefficient to be determined of the second head description and facial expression description parameters.

In the method of the third exemplary embodiment according to the invention, the captured video image data are projected in a step b) into the created three-dimensional model of the first user 5, so that a first three-dimensional representation of the head of the first user 5 captured by the first image capture device 3 is created. However, this first three-dimensional representation has at least one gap region resulting from occluded regions of the head of the first user 5 that are not visible in the captured video image data. For example, with a somewhat oblique image capture, a side region of the nose may be obscured and may thus form a gap region. Furthermore, hair may cover regions of the forehead and may thus form another gap region.

In the method of the third exemplary embodiment according to the invention, the gap regions are not taken into account in the training of the machine learning procedure as described above. In the correction of the head description parameters, the projection of the depiction of the head of the first user 5 contained in the captured video image data into the three-dimensional model of the head of the first user 5 is subjected to a geometric modelling process for producing a two-dimensional image representing the projection into the three-dimensional model. This geometric modelling process is also referred to as UV mapping. Thus, in the third exemplary embodiment of the method according to the invention, a machine learning procedure is applied to a two-dimensional image obtained by UV mapping. In other words, the machine learning procedure evaluates whether the projection into the three-dimensional model is reasonable. In particular, no Generative Adversarial Network (GAN) is used, so that this approach differs from conventional methods that use a GAN.

Optionally, key point (landmark) detectors can also be used in the third exemplary embodiment of the method according to the invention. Such key points identify the face of the user by means of machine learning procedures, in particular neural networks or regression forests. The machine learning procedure is trained for this purpose using training examples.

Optionally, the optical flow of individual points of the image can be viewed in successive video frames. Facial expressions can also be taken into account here. Lastly, differential rendering can also be used as a further, alternative approach.

Next, in the method of the third exemplary embodiment, a texture for filling the gap region is calculated in a step c).

Once the texture has been calculated, in a step d) a second three-dimensional representation of the head of the first user 5 is generated, in which the gap region or the gap regions is or are filled with the calculated texture.

It is taken into account here that the second representation of the head of the first user 5 does not comprise a three-dimensional depiction of body parts of which the size is smaller than a limit value, which is for example in a range of 1 mm to 5 mm. Certain body parts are therefore not depicted in the three-dimensional model, but are depicted as a texture in the second representation. In the method of the third exemplary embodiment, the pupils, the eyelids and the eyebrows of the head of the first user 5 are depicted only as a texture.

The following describes how to calculate the texture to fill the gap region:

The gap region is coloured. The colours of the gap region are predicted using a machine learning procedure based on colours of the captured video image data.

Colouring is performed here with two-dimensional images to restore lost parts of the image or to remove unwanted elements. Colouring reconstructs parts of the face that are obscured from the view of the first image capture device 3. In contrast to conventional approaches, the reconstruction is applied to the texture of the three-dimensional model itself.

When calculating the texture to fill the gap region, a geometric modelling process is performed to create a two-dimensional image representing the projection into the three-dimensional model. Figuratively speaking, the shape of the three-dimensional model is depicted rolled out. This is also referred to as UV mapping.

In the case of the present deformable three-dimensional model, not only can the head pose be normalised, but also different identities and facial expressions. The coloured network then predicts the colours of the occluded regions of the two-dimensional image obtained from the UV mapping using known colours. The created two-dimensional image is then used to train a Generative Adversarial Network (GAN).

The loss function of this Generative Adversarial Network (GAN) is usually only the difference of the generated image to the training example:

$$L=\Sigma_{x,y}(f(x,y)-g(x,y))^2,$$

wherein the sum extends over the entire two-dimensional image. Here, g denotes the generated image, while f denotes the expected image.

In the third exemplary embodiment of the method according to the invention, the texture for filling the gap region is calculated by a machine learning procedure trained with the following steps:

An individual image f is provided from a training video as the target image. The parameters R, t, e, s are estimated as described above. Then, the individual image f is projected onto the three-dimensional model oriented and parameterised by R, t, e, s. The two-dimensional image obtained by UV mapping is referred to as h. Here, a single-bit vector by a indicates whether the corresponding point could be recovered. The single-bit vector indicates whether this point is occluded or not. This can be used to ensure that training is not performed for occluded regions.

An additional occluding mask is then created by removing regions from h. In this way, a modified two-dimensional image is generated, which is designated h'. This masking enlarges the gap region. The regions denoted in α are set here to zero and denoted by α'.

The modified two-dimensional image h' is input into the Generative Adversarial Network (GAN) using the following reconstruction loss function:

$$L=\Sigma_{x,y}\alpha(x,y)(h(x,y)-h'(x,y))^2,$$

The loss function also includes here an opposing part that originates from a second network that is intended to distinguish real images from generated images. In the present case, the true images are two-dimensional images obtained by UV mapping, e.g. the images denoted by h above.

Through this training, the two-dimensional image h is predicted by means of the modified two-dimensional image h', ignoring anything that was obscured in the two-dimensional image h.

Lastly, in a step e), the captured video image data are modified in such a way that the head of the first user 5 is depicted by means of the second three-dimensional representation such that the target direction of gaze of the head of the first user 5 appears in the modified video image data of the first user 5 as if the first image capture device 3 were arranged on a straight line 18 passing through a first surrounding region of the eyes of the first user 5 and through a second surrounding region of the eyes of the second user 9 depicted on the first display device 4.

Subsequently, step S11 is carried out according to the first exemplary embodiment.

LIST OF REFERENCE SIGNS

1 video conferencing system
2 first video conferencing device
3 first image capture device
4 first display device
5 first user
6 second video conferencing device
7 second image capture device
8 second display device
9 second user
10 data link
11 data link
12 data link
13 data link
14 processing unit
15 position of an eye of the first user
16 direction of gaze
17 position of the depiction of an eye of the second user
18 straight line
19 capture direction
20 captured region comprising the eyes of the first user
21 direction of gaze region
22 remaining region
23 first sub-region
24 second sub-region
25 eye zone
26 transition zone
27 peripheral zone

What is claimed is:

1. Video conferencing method, in which
first video image data are reproduced by a first video conferencing device by means of a first display device and at least a region of the head of a first user comprising the eyes is captured by a first image capture device in a position in which the first user is looking at the video image data reproduced by the first display device, the video image data reproduced by the first display device comprising at least a depiction of the eyes of a second user captured by a second image capture device of a second video conferencing device arranged remotely from the first video conferencing device;
a processing unit receives and modifies the video image data of at least the region of the head of the first user comprising the eyes, captured by the first image capture device, and the modified video image data are transmitted to and reproduced by a second display device of the second video conferencing device,
the direction of gaze of the first user being detected during the processing of the video image data and, in the video image data, at least the reproduction of the region of the head of the first user comprising the eyes then being modified so that a target direction of gaze of the first user depicted in the modified video image data appears as if the first image capture device were arranged on a straight line passing through a first surrounding region of the eyes of the first user and through a second surrounding region of the eyes of the second user depicted on the first display device,
wherein:
the video image data captured by the first image capture device comprise at least a depiction of the head of the first user, the pose of the head of the first user is determined in the captured video image data, the direction of gaze of the first user is detected from the determined pose of the head of the first user, and the following steps are carried out during the processing of the captured video image data:
  a) creating a deformable three-dimensional model of the head of the first user,
  b) projecting the captured video image data into the created three-dimensional model of the first user so that a first three-dimensional representation of the head of the first user captured by the first image capture device is created, said first three-dimensional representation having at least one gap region resulting from occluded regions of the head of the first user that are not visible in the captured video image data,
  c) calculating a texture to fill the gap region,
  d) generating a second three-dimensional representation of the head of the first user, in which the gap region is filled with the calculated texture, and
  e) modifying the captured video image data in such a way that the head of the first user is depicted by the second three-dimensional representation such that the target direction of gaze of the head of the first user in the modified video image data of the first user appears as if the first image capture device were arranged on a straight line passing through a first surrounding region of the eyes of the first user and through a second surrounding region of the eyes of the second user depicted on the first display device, wherein
  during the processing of the video image data, the modified video image data are generated by a Generative Adversarial Network (GAN) with a generator network and a discriminator network,
  the generator network generating modified video image data and the discriminator network evaluating a similarity between the depiction of the head of the first user in the modified video image data and the captured video image data and also evaluating a match between the direction of gaze of the first user in the modified video image data and the target direction of gaze.

2. Video conferencing method according to claim 1, wherein
  the video image data captured by the first image capture device and comprising at least a depiction of the head of the first user are analysed by means of the processing unit in such a way that an emotion expression of the first user is detected and assigned to one or more emotion expression class(es),
  the discriminator network further evaluates a match between the emotion expression class(es) of the depiction of the head of the first user in the modified video image data and the associated emotion expression class(es) of the depiction of the head of the first user in the captured video image data.

3. Video conferencing method, in which
first video image data are reproduced by a first video conferencing device by means of a first display device and at least a region of the head of a first user comprising the eyes is captured by a first image capture device in a position in which the first user is looking at the video image data reproduced by the first display device, the video image data reproduced by the first display device comprising at least a depiction of the eyes of a second user captured by a second image capture device of a second video conferencing device arranged remotely from the first video conferencing device;

a processing unit receives and modifies the video image data of at least the region of the head of the first user comprising the eyes, captured by the first image capture device, and the modified video image data are transmitted to and reproduced by a second display device of the second video conferencing device, the direction of gaze of the first user being detected during the processing of the video image data and, in the video image data, at least the reproduction of the region of the head of the first user comprising the eyes then being modified so that a target direction of gaze of the first user depicted in the modified video image data appears as if the first image capture device were arranged on a straight line passing through a first surrounding region of the eyes of the first user and through a second surrounding region of the eyes of the second user depicted on the first display device, wherein:
  the video image data captured by the first image capture device comprise at least a depiction of the head of the first user,
  the pose of the head of the first user is determined in the captured video image data,
  the direction of gaze of the first user is detected from the determined pose of the head of the first user, and
  the following steps are carried out during the processing of the captured video image data:
    a) creating a deformable three-dimensional model of the head of the first user,
    b) projecting the captured video image data into the created three-dimensional model of the first user so that a first three-dimensional representation of the head of the first user captured by the first image capture device is created, said first three-dimensional representation having at least one gap region resulting from occluded regions of the head of the first user that are not visible in the captured video image data,
    c) calculating a texture to fill the gap region,
    d) generating a second three-dimensional representation of the head of the first user, in which the gap region is filled with the calculated texture, and
    e) modifying the captured video image data in such a way that the head of the first user is depicted by the second three-dimensional representation such that the target direction of gaze of the head of the first user in the modified video image data of the first user appears as if the first image capture device were arranged on a straight line passing through a first surrounding region of the eyes of the first user and through a second surrounding region of the eyes of the second user depicted on the first display device, wherein
  during the processing of the video image data, a direction of gaze region representing the eyes of the first user is extracted from a remaining region, thereby generating video image partial data,
  this direction of gaze region is then modified in the video image partial data so that the direction of gaze of the first user given by the depiction of the eyes appears in the modified video image partial data of this direction of gaze region as if the first image capture device were arranged on the straight line, and then the modified video image partial data of the direction of gaze region are reinserted into the remaining region of the video image data, thereby generating the modified video image data, and the direction of gaze region of the video image data is divided into a first sub-region comprising the depiction of a first eye of the first user and a second sub-region comprising the depiction of a second eye of the first user.

4. Video conferencing method, in which first video image data are reproduced by a first video conferencing device by means of a first display device and at least a region of the head of a first user comprising the eyes is captured by a first image capture device in a position in which the first user is looking at the video image data reproduced by the first display device, the video image data reproduced by the first display device comprising at least a depiction of the eyes of a second user captured by a second image capture device of a second video conferencing device arranged remotely from the first video conferencing device;

a processing unit receives and modifies the video image data of at least the region of the head of the first user comprising the eyes, captured by the first image capture device, and the modified video image data are transmitted to and reproduced by a second display device of the second video conferencing device, the direction of gaze of the first user being detected during the processing of the video image data and, in the video image data, at least the reproduction of the region of the head of the first user comprising the eyes then being modified so that a target direction of gaze of the first user depicted in the modified video image data appears as if the first image capture device were arranged on a straight line passing through a first surrounding region of the eyes of the first user and through a second surrounding region of the eyes of the second user depicted on the first display device, wherein:

the video image data captured by the first image capture device comprise at least a depiction of the head of the first user, the pose of the head of the first user is determined in the captured video image data, the direction of gaze of the first user is detected from the determined pose of the head of the first user, and the following steps are carried out during the processing of the captured video image data:
  a) creating a deformable three-dimensional model of the head of the first user,
  b) projecting the captured video image data into the created three-dimensional model of the first user so that a first three-dimensional representation of the head of the first user captured by the first image capture device is created, said first three-dimensional representation having at least one gap region resulting from occluded regions of the head of the first user that are not visible in the captured video image data,
  c) calculating a texture to fill the gap region,
  d) generating a second three-dimensional representation of the head of the first user, in which the gap region is filled with the calculated texture, and
  e) modifying the captured video image data in such a way that the head of the first user is depicted by the second three-dimensional representation such that the target direction of gaze of the head of the first user in the modified video image data of the first user appears as if the first image capture device were arranged on a straight line passing through a first surrounding region of the eyes of the first user and through a second surrounding region of the eyes of the second user depicted on the first display device, wherein during the processing of the video image data, a direction of gaze region representing the eyes of the first user is extracted from a remaining region, thereby generating video image partial data, this direction of gaze region is then modified in the video image partial data so that the direction of gaze of the first user given by the depiction of the eyes appears in the modified video image partial data of this direction of gaze region as if the first image capture device were arranged on the straight line, and then the modified video image partial data of the direction of gaze region are reinserted into the remaining region of the video image data, thereby generating the modified video image data, the direction of gaze region comprises a peripheral zone, an eye zone comprising the depiction of the iris including the pupil of at least one of the eyes of the first user, and a transition zone between the peripheral zone and the eye zone, and during processing of the video image data, the direction of gaze region is then changed such that the eye zone is changed such that the direction of gaze of the first user in the modified video image data of the eye zone appears as if the first image capture device were arranged on the straight line, the depiction in the peripheral zone seamlessly adjoins the depiction of adjacent regions of the remaining region, and in the transition zone the video image data are modified such that there is a transition from the modified depiction in the eye zone to the depiction in the peripheral zone.

5. Video conferencing method, in which first video image data are reproduced by a first video conferencing device by means of a first display device and at least a region of the head of a first user comprising the eyes is captured by a first image capture device in a position in which the first user is looking at the video image data reproduced by the first display device, the video image data reproduced by the first display device comprising at least a depiction of the eyes of a second user captured by a second image capture device of a second video conferencing device arranged remotely from the first video conferencing device;

a processing unit receives and modifies the video image data of at least the region of the head of the first user comprising the eyes, captured by the first image capture device, and the modified video image data are transmitted to and reproduced by a second display device of the second video conferencing device, the direction of gaze of the first user being detected during the processing of the video image data and, in the video image data, at least the reproduction of the region of the head of the first user comprising the eyes then being modified so that a target direction of gaze of the first user depicted in the modified video image data appears as if the first image capture device were arranged on a straight line passing through a first surrounding region of the eyes of the first user and through a second surrounding region of the eyes of the second user depicted on the first display device, wherein:
the video image data captured by the first image capture device comprise at least a depiction of the head of the first user,
the pose of the head of the first user is determined in the captured video image data,
the direction of gaze of the first user is detected from the determined pose of the head of the first user, and
the following steps are carried out during the processing of the captured video image data:
a) creating a deformable three-dimensional model of the head of the first user,
b) projecting the captured video image data into the created three-dimensional model of the first user so that a first three-dimensional representation of the head of the first user captured by the first image capture device is created, said first three-dimensional representation having at least one gap region resulting from occluded regions of the head of the first user that are not visible in the captured video image data,
c) calculating a texture to fill the gap region,
d) generating a second three-dimensional representation of the head of the first user, in which the gap region is filled with the calculated texture, and
e) modifying the captured video image data in such a way that the head of the first user is depicted by the second three-dimensional representation such that the target direction of gaze of the head of the first user in the modified video image data of the first user appears as if the first image capture device were arranged on a straight line passing through a first surrounding region of the eyes of the first user and through a second surrounding region of the eyes of the second user depicted on the first display device,
wherein
the second representation of the head of the first user does not comprise a three-dimensional representation of body parts of which the size is smaller than a limit value, and in that these body parts are depicted as a texture in the second representation.

6. Video conferencing method, in which
first video image data are reproduced by a first video conferencing device by means of a first display device and at least a region of the head of a first user comprising the eyes is captured by a first image capture device in a position in which the first user is looking at the video image data reproduced by the first display device, the video image data reproduced by the first display device comprising at least a depiction of the eyes of a second user captured by a second image capture device of a second video conferencing device arranged remotely from the first video conferencing device;
a processing unit receives and modifies the video image data of at least the region of the head of the first user comprising the eyes, captured by the first image capture device, and the modified video image data are transmitted to and reproduced by a second display device of the second video conferencing device,
the direction of gaze of the first user being detected during the processing of the video image data and, in the video image data, at least the reproduction of the region of the head of the first user comprising the eyes then being modified so that a target direction of gaze of the first user depicted in the modified video image data appears as if the first image capture device were arranged on a straight line passing through a first surrounding region of the eyes of the first user and through a second surrounding region of the eyes of the second user depicted on the first display device,
wherein:
the video image data captured by the first image capture device comprise at least a depiction of the head of the first user,
the pose of the head of the first user is determined in the captured video image data,
the direction of gaze of the first user is detected from the determined pose of the head of the first user, and
the following steps are carried out during the processing of the captured video image data:
a) creating a deformable three-dimensional model of the head of the first user,
b) projecting the captured video image data into the created three-dimensional model of the first user so that a first three-dimensional representation of the head of the first user captured by the first image capture device is created, said first three-dimensional representation having at least one gap region resulting from occluded regions of the head of the first user that are not visible in the captured video image data,
c) calculating a texture to fill the gap region,
d) generating a second three-dimensional representation of the head of the first user, in which the gap region is filled with the calculated texture, and
e) modifying the captured video image data in such a way that the head of the first user is depicted by the second three-dimensional representation such that the target direction of gaze of the head of the first user in the modified video image data of the first user appears as if the first image capture device were arranged on a straight line passing through a first surrounding region of the eyes of the first user and through a second surrounding region of the eyes of the second user depicted on the first display device,
wherein
the three-dimensional model of the head generated in step a) comprises parameterised nodal points, so that the three-dimensional model of the head is defined by a parameter set comprising a plurality of parameters,
the parameters for the three-dimensional model generated in step a) comprise head description parameters and facial expression parameters,
the head description parameters being determined individually for different users and the facial expression parameters are determined for the captured video image data, and
the coefficients of the head description parameters are obtained by a machine learning procedure in which
a correction of coefficients of the head description parameters is calculated by a projection of the depiction of the head of the first user contained in the captured video image data into the three-dimensional model of the head of the first user.

7. Video conferencing method according to claim 6, wherein
the training of the machine learning procedure does not take into account the at least one gap region.

8. Video conferencing method according to claim 6, wherein
during the correction of the head description parameters, the projection of the depiction of the head of the first user contained in the captured video image data into the three-dimensional model of the head of the first user is subjected to a geometric modelling process to produce a two-dimensional image representing the projection into the three-dimensional model.

9. Video conferencing method, in which
first video image data are reproduced by a first video conferencing device by means of a first display device and at least a region of the head of a first user comprising the eyes is captured by a first image capture device in a position in which the first user is looking at the video image data reproduced by the first display device, the video image data reproduced by the first display device comprising at least a depiction of the eyes of a second user captured by a second image capture device of a second video conferencing device arranged remotely from the first video conferencing device;
a processing unit receives and modifies the video image data of at least the region of the head of the first user comprising the eyes, captured by the first image capture device, and the modified video image data are transmitted to and reproduced by a second display device of the second video conferencing device,
the direction of gaze of the first user being detected during the processing of the video image data and, in the video image data, at least the reproduction of the region of the head of the first user comprising the eyes then being modified so that a target direction of gaze of the first user depicted in the modified video image data appears as if the first image capture device were arranged on a straight line passing through a first surrounding region of the eyes of the first user and through a second surrounding region of the eyes of the second user depicted on the first display device,
wherein:
the video image data captured by the first image capture device comprise at least a depiction of the head of the first user,
the pose of the head of the first user is determined in the captured video image data,
the direction of gaze of the first user is detected from the determined pose of the head of the first user, and
the following steps are carried out during the processing of the captured video image data:
a) creating a deformable three-dimensional model of the head of the first user,
b) projecting the captured video image data into the created three-dimensional model of the first user so that a first three-dimensional representation of the head of the first user captured by the first image capture device is created, said first three-dimensional representation having at least one gap region resulting from occluded regions of the head of the first user that are not visible in the captured video image data,
c) calculating a texture to fill the gap region,
d) generating a second three-dimensional representation of the head of the first user, in which the gap region is filled with the calculated texture, and
e) modifying the captured video image data in such a way that the head of the first user is depicted by the second three-dimensional representation such that the target direction of gaze of the head of the first user in the modified video image data of the first user appears as if the first image capture device were arranged on a straight line passing through a first surrounding region of the eyes of the first user and through a second surrounding region of the eyes of the second user depicted on the first display device, wherein
the three-dimensional model of the head generated in step a) comprises parameterised nodal points, so that the three-dimensional model of the head is defined by a parameter set comprising a plurality of parameters,
the parameters for the three-dimensional model generated in step a) comprise head description parameters and facial expression parameters,
the head description parameters being determined individually for different users and the facial expression parameters are determined for the captured video image data, and
the head description parameters can be obtained by a machine learning procedure trained as follows:
generating test coefficients for a start vector and a first and second head description parameter and a first and second facial expression description parameter, the test coefficients for the first and second head description parameters and the first and second facial expression description parameters being identical except for, in each case, a coefficient to be determined,
generating a test depiction of a head with the test coefficients for the start vector and the second head description parameter and the second facial expression description parameter,
retrieving an image colour for each nodal point with the test coefficients for the start vector and the first head description parameter and the first facial expression description parameter, and
inputting the retrieved image colours into the machine learning procedure and optimising the parameters of the machine learning procedure so that the difference between the result of the machine learning procedure and the coefficient to be determined of the second head description and facial expression description parameters is minimised.

10. Video conferencing, in which
first video image data are reproduced by a first video conferencing device by means of a first display device and at least a region of the head of a first user comprising the eyes is captured by a first image capture device in a position in which the first user is looking at the video image data reproduced by the first display device, the video image data reproduced by the first display device comprising at least a depiction of the eyes of a second user captured by a second image capture device of a second video conferencing device arranged remotely from the first video conferencing device;
a processing unit receives and modifies the video image data of at least the region of the head of the first user comprising the eyes, captured by the first image capture device, and the modified video image data are transmitted to and reproduced by a second display device of the second video conferencing device,
the direction of gaze of the first user being detected during the processing of the video image data and, in the video image data, at least the reproduction of the region of the head of the first user comprising the eyes then being modified so that a target direction of gaze of the first user depicted in the modified video image data appears as if the first image capture device were arranged on a straight line passing through a first surrounding region of the eyes of the first user and through a second surrounding region of the eyes of the second user depicted on the first display device, wherein:
the video image data captured by the first image capture device comprise at least a depiction of the head of the first user,
the pose of the head of the first user is determined in the captured video image data,
the direction of gaze of the first user is detected from the determined pose of the head of the first user, and
the following steps are carried out during the processing of the captured video image data:
a) creating a deformable three-dimensional model of the head of the first user,
b) projecting the captured video image data into the created three-dimensional model of the first user so that a first three-dimensional representation of the head of the first user captured by the first image capture device is created, said first three-dimensional representation having at least one gap region resulting from occluded regions of the head of the first user that are not visible in the captured video image data,
c) calculating a texture to fill the gap region,
d) generating a second three-dimensional representation of the head of the first user, in which the gap region is filled with the calculated texture, and
e) modifying the captured video image data in such a way that the head of the first user is depicted by the second three-dimensional representation such that the target direction of gaze of the head of the first user in the modified video image data of the first user appears as if the first image capture device were arranged on a straight line passing through a first surrounding region of the eyes of the first user and through a second surrounding region of the eyes of the second user depicted on the first display device,
wherein
in step c) colours of the gap region are predicted by means of a machine learning procedure using colours of the captured video image data.

11. Video conferencing method, in which
first video image data are reproduced by a first video conferencing device by means of a first display device and at least a region of the head of a first user comprising the eyes is captured by a first image capture device in a position in which the first user is looking at the video image data reproduced by the first display device, the video image data reproduced by the first display device comprising at least a depiction of the eyes of a second user captured by a second image capture device of a second video conferencing device arranged remotely from the first video conferencing device;
a processing unit receives and modifies the video image data of at least the region of the head of the first user comprising the eyes, captured by the first image capture device, and the modified video image data are transmitted to and reproduced by a second display device of the second video conferencing device,
the direction of gaze of the first user being detected during the processing of the video image data and, in the video image data, at least the reproduction of the region of the head of the first user comprising the eyes then being modified so that a target direction of gaze of the first user depicted in the modified video image data appears as if the first image capture device were arranged on a straight line passing through a first surrounding region of the eyes of the first user and through a second surrounding region of the eyes of the second user depicted on the first display device,
wherein:
the video image data captured by the first image capture device comprise at least a depiction of the head of the first user,
the pose of the head of the first user is determined in the captured video image data,
the direction of gaze of the first user is detected from the determined pose of the head of the first user, and
the following steps are carried out during the processing of the captured video image data:
a) creating a deformable three-dimensional model of the head of the first user,
b) projecting the captured video image data into the created three-dimensional model of the first user so that a first three-dimensional representation of the head of the first user captured by the first image capture device is created, said first three-dimensional representation having at least one gap region resulting from occluded regions of the head of the first user that are not visible in the captured video image data,
c) calculating a texture to fill the gap region,
d) generating a second three-dimensional representation of the head of the first user, in which the gap region is filled with the calculated texture, and
e) modifying the captured video image data in such a way that the head of the first user is depicted by the second three-dimensional representation such that the target direction of gaze of the head of the first user in the modified video image data of the first user appears as if the first image capture device were arranged on a straight line passing through a first surrounding region of the eyes of the first user and through a second surrounding region of the eyes of the second user depicted on the first display device,
wherein
in step c), when calculating a texture to fill the gap region, a geometric modelling process is performed to create a two-dimensional image representing the projection, obtained in step b), into the three-dimensional model, and the created two-dimensional image is used to train a Generative Adversarial Network (GAN).

12. Video conferencing method according to claim 11, wherein
the texture for filling the gap region in step c) is calculated by a machine learning procedure trained with the following steps:
c1) providing a video frame from training video image data,
c2) estimating parameters of the three-dimensional model of the head of the first user,
c3) projecting the provided video frame into the three-dimensional model of the first user with the estimated parameters,
c4) creating a two-dimensional image representing the projection created in step c3) and containing the gap region,
c5) creating a modified two-dimensional image by applying a masking to the two-dimensional image created in step c4), the gap region being enlarged by the masking,
c6) inputting the modified two-dimensional image created in step c5) into the Generative Adversarial Network (GAN) training, the difference of the two-dimensional image and of the modified two-dimensional image being considered in the loss function.

13. Video conferencing method, in which
first video image data are reproduced by a first video conferencing device by means of a first display device and at least a region of the head of a first user comprising the eyes is captured by a first image capture device in a position in which the first user is looking at the video image data reproduced by the first display device, the video image data reproduced by the first display device comprising at least a depiction of the eyes of a second user captured by a second image capture device of a second video conferencing device arranged remotely from the first video conferencing device;

a processing unit receives and modifies the video image data of at least the region of the head of the first user comprising the eyes, captured by the first image capture device, and the modified video image data are transmitted to and reproduced by a second display device of the second video conferencing device, the direction of gaze of the first user being detected during the processing of the video image data and, in the video image data, at least the reproduction of the region of the head of the first user comprising the eyes then being modified so that a target direction of gaze of the first user depicted in the modified video image data appears as if the first image capture device were arranged on a straight line passing through a first surrounding region of the eyes of the first user and through a second surrounding region of the eyes of the second user depicted on the first display device, wherein:
the video image data captured by the first image capture device comprise at least a depiction of the head of the first user,
the pose of the head of the first user is determined in the captured video image data,
the direction of gaze of the first user is detected from the determined pose of the head of the first user, and
the following steps are carried out during the processing of the captured video image data:
 a) creating a deformable three-dimensional model of the head of the first user,
 b) projecting the captured video image data into the created three-dimensional model of the first user so that a first three-dimensional representation of the head of the first user captured by the first image capture device is created, said first three-dimensional representation having at least one gap region resulting from occluded regions of the head of the first user that are not visible in the captured video image data,
 c) calculating a texture to fill the gap region,
 d) generating a second three-dimensional representation of the head of the first user, in which the gap region is filled with the calculated texture, and
 e) modifying the captured video image data in such a way that the head of the first user is depicted by the second three-dimensional representation such that the target direction of gaze of the head of the first user in the modified video image data of the first user appears as if the first image capture device were arranged on a straight line passing through a first surrounding region of the eyes of the first user and through a second surrounding region of the eyes of the second user depicted on the first display device, wherein
successive video frames are captured by the first image capture device and, when the direction of gaze of the first user changes, some video frames are interpolated during the processing of the video image data in such a way that the change in direction of gaze reproduced by the modified video image data is slowed down.

14. Video conferencing system comprising
a first video conferencing device having a first display device and a first image capture device, the first image capture device being arranged to capture at least a region of the head of a first user, said region comprising the eyes, in a position in which the first user is looking at the video image data depicted by the first display device, a second video conferencing device remotely located from the first video conferencing device, coupled to the first video conferencing device for data exchange, and having a second display device for reproducing video image data captured by the first image capture device, a processing unit which is coupled to the first image capture device and which is configured to receive and process the video image data captured by the first image capture device and to transmit the processed video image data to the second display device of the second video conferencing device, the processing unit being configured to detect the direction of gaze of the depicted first user when processing the video image data and to modify in the video image data the reproduction at least of the region of the head of the first user comprising the eyes such that the target direction of gaze of the first user appears in the modified video image data as if the first image capture device were arranged on a straight line passing through a first surrounding region of the eyes of the first user and through a second surrounding region of the eyes of the second user depicted on the first display device, wherein
the video image data captured by the first image capture device comprise at least a depiction of the head of the first user,
the processing unit is also configured such that the pose of the head of the first user is determined in the captured video image data, the direction of gaze of the first user is detected from the determined pose of the head of the first user, and the following steps are carried out during the processing of the captured video image data:
 a) creating a deformable three-dimensional model of the head of the first user,
 b) projecting the captured video image data into the created three-dimensional model of the first user so that a first three-dimensional representation of the head of the first user captured by the first image capture device is created, said first three-dimensional representation having at least one gap region resulting from occluded regions of the head of the first user that are not visible in the captured video image data,
 c) calculating a texture to fill the gap region,
 d) generating a second three-dimensional representation of the head of the first user, in which the gap region is filled with the calculated texture, and
 e) modifying the captured video image data in such a way that the head of the first user is depicted by the second three-dimensional representation such that the target direction of gaze of the head of the first user in the modified video image data of the first user appears as if the first image capture device were arranged on a straight line passing through a first surrounding region of the eyes of the first user and through a second surrounding region of the eyes of the second user depicted on the first display device, wherein a Generative Adversarial Network (GAN), with a generator network and a discriminator network, generates the modified image data during the processing of the video image data, and the generator network generating modified video image data and the discriminator network evaluating a similarity between the depiction of the head of the first user in the modified video image data and the captured video image data and also evaluating a match between the direction of gaze of the first user in the modified video image data and the target direction of gaze.

15. Video conferencing system comprising:

a first video conferencing device having a first display device and a first image capture device, the first image capture device being arranged to capture at least a region of the head of a first user, said region comprising the eyes, in a position in which the first user is looking at the video image data depicted by the first display device, a second video conferencing device remotely located from the first video conferencing device, coupled to the first video conferencing device for data exchange, and having a second display device for reproducing video image data captured by the first image capture device, a processing unit which is coupled to the first image capture device and which is configured to receive and process the video image data captured by the first image capture device and to transmit the processed video image data to the second display device (8) of the second video conferencing device, the processing unit being configured to detect the direction of gaze of the depicted first user when processing the video image data and to modify in the video image data the reproduction at least of the region of the head of the first user comprising the eyes such that the target direction of gaze of the first user appears in the modified video image data as if the first image capture device were arranged on a straight line passing through a first surrounding region of the eyes of the first user and through a second surrounding region of the eyes of the second user depicted on the first display device, wherein the video image data captured by the first image capture device comprise at least a depiction of the head of the first user, the processing unit is also configured such that the pose of the head of the first user is determined in the captured video image data, the direction of gaze of the first user is detected from the determined pose of the head of the first user, and the following steps are carried out during the processing of the captured video image data:

a) creating a deformable three-dimensional model of the head of the first user, b) projecting the captured video image data into the created three-dimensional model of the first user so that a first three-dimensional representation of the head of the first user captured by the first image capture device is created, said first three-dimensional representation having at least one gap region resulting from occluded regions of the head of the first user that are not visible in the captured video image data, c) calculating a texture to fill the gap region, d) generating a second three-dimensional representation of the head of the first user, in which the gap region is filled with the calculated texture, and e) modifying the captured video image data in such a way that the head of the first user is depicted by the second three-dimensional representation such that the target direction of gaze of the head of the first user in the modified video image data of the first user appears as if the first image capture device were arranged on a straight line passing through a first surrounding region of the eyes of the first user and through a second surrounding region of the eyes of the second user depicted on the first display device, wherein the first image capture device captures successive video frames and, when the direction of gaze of the first user changes, some video frames are interpolated during the processing of the video image data in such a way that the change in direction of gaze reproduced by the modified video image data is slowed down.

* * * * *